United States Patent
Shavit et al.

(10) Patent No.: US 6,993,577 B2
(45) Date of Patent: Jan. 31, 2006

(54) SYSTEM AND METHOD FOR MIGRATION OF SUBSCRIBER DATA

(75) Inventors: Moshe Shavit, Lexington, MA (US); Chanan Kubitsky, Tel Aviv (IL)

(73) Assignee: Comverse, Inc., Wakefield, MA (US)

( * ) Notice: Subject to any disclaimer, the term of this patent is extended or adjusted under 35 U.S.C. 154(b) by 605 days.

(21) Appl. No.: 09/739,745

(22) Filed: Dec. 20, 2000

(65) Prior Publication Data

US 2002/0078167 A1   Jun. 20, 2002

(51) Int. Cl.
   *G06F 15/173*   (2006.01)

(52) U.S. Cl. .................. 709/223; 709/205; 709/213; 709/217; 709/232; 709/238; 709/239; 709/244; 455/414; 455/414.2; 455/433; 455/461

(58) Field of Classification Search .......... 709/205, 709/217, 232, 238, 239, 244, 319, 109, 226, 709/223, 105, 213, 224; 455/414, 414.2, 455/461, 433

See application file for complete search history.

(56) References Cited

U.S. PATENT DOCUMENTS

| | | | |
|---|---|---|---|
| 5,241,588 A | | 8/1993 | Babson, III et al. .... 379/201.03 |
| 5,627,877 A | * | 5/1997 | Penttonen ................... 455/413 |
| 5,909,483 A | | 6/1999 | Weare et al. ............ 379/88.18 |
| 5,915,008 A | | 6/1999 | Dulman ...................... 709/200 |
| 5,958,016 A | * | 9/1999 | Chang et al. ............... 709/229 |
| 5,999,973 A | | 12/1999 | Glitho et al. ............... 709/223 |
| 6,031,904 A | | 2/2000 | An et al. ............... 379/201.02 |
| 6,032,184 A | | 2/2000 | Cogger et al. .............. 709/223 |
| 6,035,198 A | | 3/2000 | Wiehe ......................... 455/445 |
| 6,041,325 A | | 3/2000 | Shah et al. .................... 707/10 |
| 6,064,887 A | | 5/2000 | Kallioniemi et al. ....... 455/445 |
| 6,067,456 A | | 5/2000 | Duran ......................... 455/461 |
| 6,490,587 B2 | * | 12/2002 | Easty et al. ................. 709/203 |
| 6,618,593 B1 | * | 9/2003 | Drutman et al. ............ 455/266 |
| 6,714,636 B1 | * | 3/2004 | Baiyor et al. .......... 379/211.04 |
| 6,742,033 B1 | * | 5/2004 | Smith et al. ................ 709/224 |

FOREIGN PATENT DOCUMENTS

| | | | | |
|---|---|---|---|---|
| JP | 411187126 A | * | 7/1999 | |
| WO | WO 99/56492 | | 11/1999 | ...................... 7/38 |
| WO | WO 99/63779 | | 12/1999 | ...................... 7/38 |

* cited by examiner

*Primary Examiner*—Zarni Maung
*Assistant Examiner*—Hassan Phillips
(74) *Attorney, Agent, or Firm*—Staas & Halsey LLP

(57) ABSTRACT

A distributed communication system is most efficient if subscriber data is located as close as possible to subscribers when they access the system. However, it is common for subscribers of mobile communication systems to relocate for long periods of time. Relocation of subscribers is automatically detected by generating an activity log file of location data and identifiers, where each identifier is associated with either a communication device or a person using the communication system. Pattern analysis is automatically performed based on the location data and the identifiers to determine whether private data should be relocated from a first location to a second location within the communication system, when service can be provided more efficiently from the second location.

14 Claims, 3 Drawing Sheets

SYSTEM AND METHOD FOR MIGRATION OF SUBSCRIBER DATA

BACKGROUND OF THE INVENTION

1. Field of the Invention

The present invention is directed to automatically relocating private data in a communication network having a distributed architecture to increase the efficiency of the network and, more particularly, to moving subscriber records within that network based on pattern analysis of location data indicating when access to the information services requires retrieval of subscriber records from remote locations.

2. Description of the Related Art

There are many types of communication systems that have distributed architecture in which data that is frequently accessed is desirably located close to the initial port of access. For example, information about subscribers to cellular telephone systems is stored in a home location register (HLR) that must be accessed each time a call is made by or to a subscriber. Typically, the information is initially stored at the HLR closest to where the service is initiated or the residence or business address of the subscriber When a cellular telephone is used outside the home area, the system controlling communication with the cellular phone accesses the HLR and stores the subscriber data in a visitor location register (VLR). The subscriber data in the VLR is used as long as the phone stays within the area service that is serviced by the VLR. The subscriber data in the VLR is removed if the phone is unused beyond a designated period of time.

Another example of a communication system with a distributed architecture is an enhanced services systems that provide messaging services to subscribers of telephone systems, both wireline and wireless systems. Such systems are examples of information services systems and may include facsimile servers, e-mail servers, unified messaging servers, providing financial services, news and sports reports, video on demand, music downloads, business information including addresses, telephone numbers, hours of operation, etc. Information services systems that are distributed over a wide geographic area, such as those that provide services to subscribers of a national or regional wireless telephone network, such as Sprint PCS®, AT&T Wireless, Cegetel (France), T-Mobil (Germany), etc., allow their subscribers to access services through access ports that are distributed throughout the coverage area. The access ports store subscriber records that typically must be accessed to provide the services. To minimize use of network resources when the subscriber record is accessed, it is preferable to keep the subscriber record at the location that is closest to the access port first used by the subscriber.

Conventionally, subscriber records or profiles are relocated in response to notices received from a subscriber that the subscriber's primary location has moved, or by manual analysis of access to the services provided by the information services system. Known techniques for automatically relocating subscriber profiles and other private data associated with subscribers, e.g., messages stored for the subscriber, are only performed for purposes of load balancing, such as when a new server is installed, as disclosed in U.S. Pat. No. 5,909,483, incorporated herein by reference.

SUMMARY OF THE INVENTION

An object of the present invention is to improve efficiency of communication systems by automatically relocating subscriber records in a geographically distributed database.

Another object of the present invention is to reduce the use of network resources, such as transmission bandwidth, in accessing subscriber profiles and other private data in a geographically distributed database.

A further object of the present invention is to improve the quality of service to subscribers of information services systems.

The above objects are attained by providing a method of relocating data in a distributed communication system, including generating an activity log file of location data and identifiers, each identifier associated with one of a communication device and a person using the communication system; automatically performing pattern analysis based on the location data and the identifiers; and relocating private data, associated with one of the identifiers, from a first location to a second location within the communication system when the pattern analysis indicates that service can be provided more efficiently from the second location.

These objects, together with other objects and advantages which will be subsequently apparent, reside in the details of construction and operation as more fully hereinafter described and claimed, reference being had to the accompanying drawings forming a part hereof, wherein like reference numerals refer to like parts throughout.

DETAILED DESCRIPTION OF THE INVENTION

Figure 1:
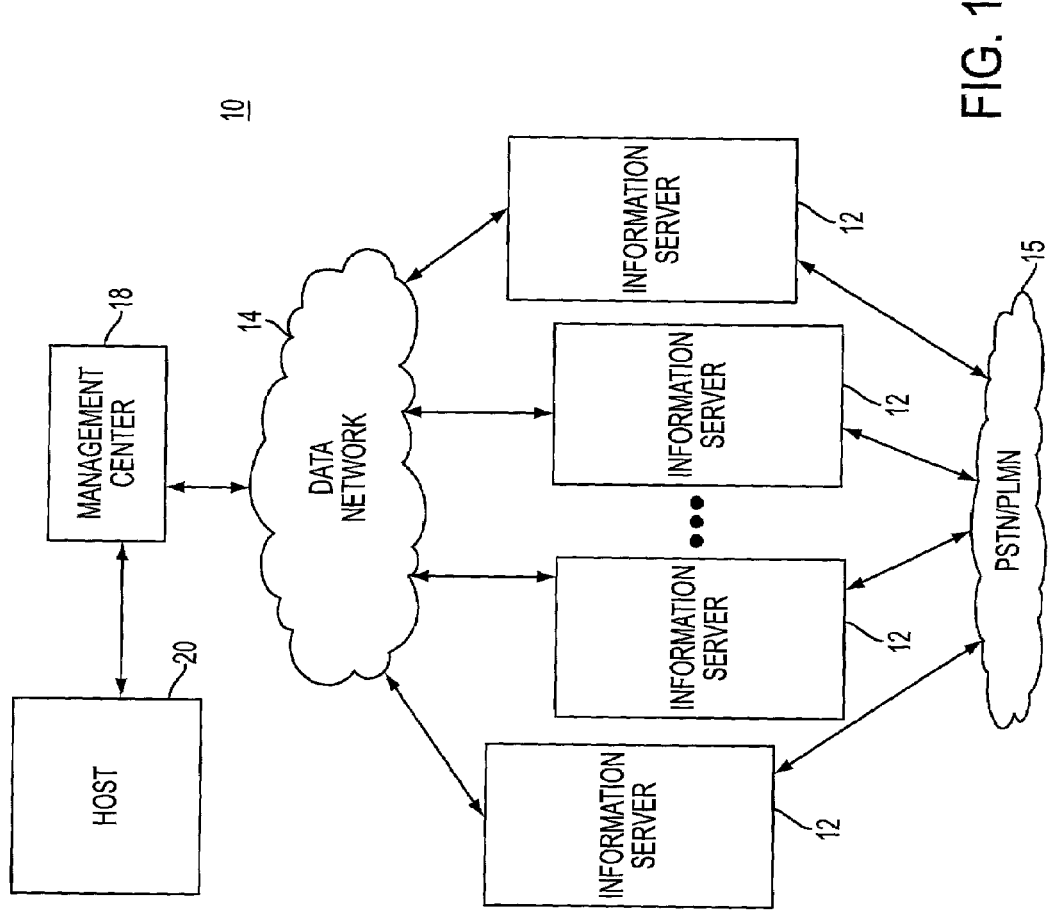
FIG. 1 is a block diagram of a distributed information services system.

Although the present invention can be applied to many different types of communication systems, as an example an embodiment of the invention will be described in which the communication system is an information services, or enhanced services system having a distributed architecture. A block diagram of a portion of a distributed information services system 10 is illustrated in FIG. 1. Access to information services is provided by access units, specifically information servers 12, four of which are illustrated in FIG. 1. An actual information services system could have 100 or more information servers 12. The information servers 12 are interconnected by a data communication network 14, such as a wide area network (WAN), and a public switched telephone network (PSTN) or public land mobile network (PLMN) 15 and sometimes to the Internet 16 via a firewall unit (FWU) 17 (see FIG. 2). A management center 18 is also connected to the data communication network 14 to manage overall operation of the distributed information services system 10. Typically, the information services system 10 is provided for subscribers of a single telecommunication network (e.g., a large regional or national cellular telephone network, such as Sprint PCS®). Under these circumstances, a host computer 20 of the telecommunication network company may be connected to the management center 18 to provide access to the operational information stored therein by the employees of the telecommunication network company.

Figure 2:
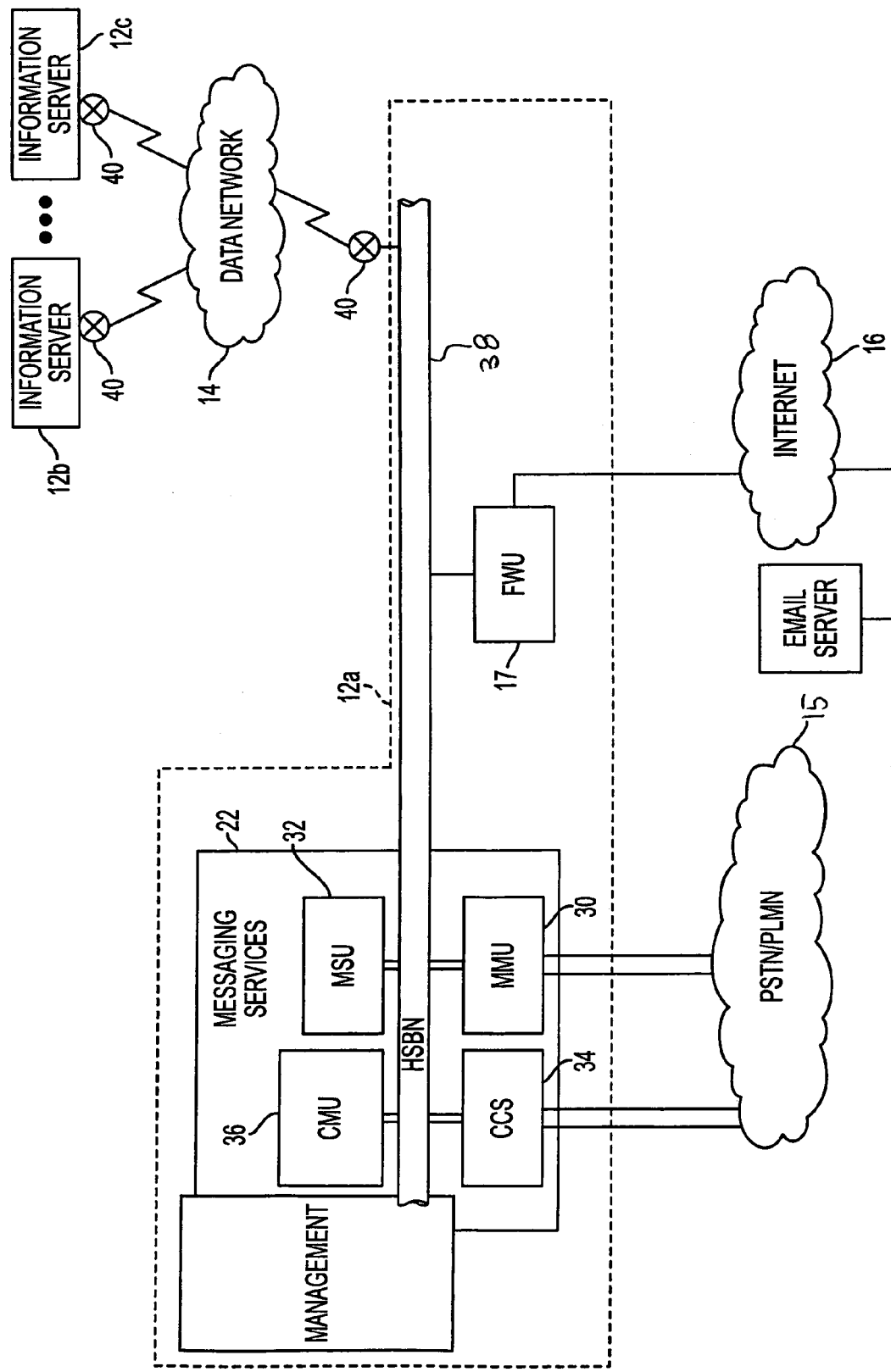
FIG. 2 is a block diagram of an information server in a distributed information services system.

An example of an information server 12 illustrated in FIG. 2 is a TRILOGUE™ INfinity™ from Comverse Network Systems of Wakefield, Mass. However, it should be understood that the present invention is not limited to information servers having the architecture illustrated in FIG. 2 and any suitable architecture may be used. Major components that may be included in an information server 12 include units providing basic messaging services 22, such as voice mail and facsimile, unified messaging services, such as e-mail, and short message services. The short message service messages are conventionally communicated by cellular telephone network(s) in the PSTN/PLMN 15 or transmitted via a public data communications network, such as the Internet 16.

The basic messaging services 22 are provided by a plurality of multi-media units (MMUs) 30, connected to voice trunks in the PSTN/PLMN 15, that perform voice signal processing functions and a plurality of messaging and storage units (MSUs) 32 that store the subscriber records and hosts application logic. The MMUs 30 can be provided by computers controlled by single or multiple microprocessors, such as Pentium-based computers, manufactured by Comverse Network Systems, Inc. of Wakefield, Mass., with 1 MB memory, 4 GB system disk storage, network interface cards and voice processing cards. The MSU 32 is similar computer having up to 18 GB additional storage for private subscriber information. A call control server (CCS) 34 interfaces with call signaling trunks, such as SS7, system message desk interface (SMDI), etc. in the PSTN/PLMN 15 to provide information on the calling number, etc. The CCS 34 may be a similar Pentium-based computer made by Ulticom Corp. of Mount Laurel, N.J. with network interface cards. Overall control of messaging services is performed by central management unit (CMU) 36 which is connected to the MMUs 30, MSUs 32 and CCS 34 by high-speed backbone network (HSBN) 38, such as a switched Ethernet supporting 10BaseT and 100BaseT. The CMU 36 may be an Alpha-based computer made by Compaq of Houston, Tex., with interfaces to the HSBN as well as to the host management computer of the network operator.

When a subscriber calls an information server, such as information server 12a, the call reaches an MMU 30 that interacts with the subscriber record stored on the subscriber's home MSU 32. The CMU 36 performs address resolution to identify the home MSU 32 and communicates with CMUs 36 in other information servers, e.g. 12b, 12c via routers 40 and data network 14 when the required home MSU 32 is located at one of the other information servers 12b, 12c. If the subscriber's call reaches an MMU 30 with his home MSU 32 located on the same information server 12a, that is local access. If the home MSU 32 is located on another information server 12b or 12c, that is considered remote access. Remote access is less efficient, uses more network resources and potentially provides lower quality of service as compared to local access.

Figures 3, 4:
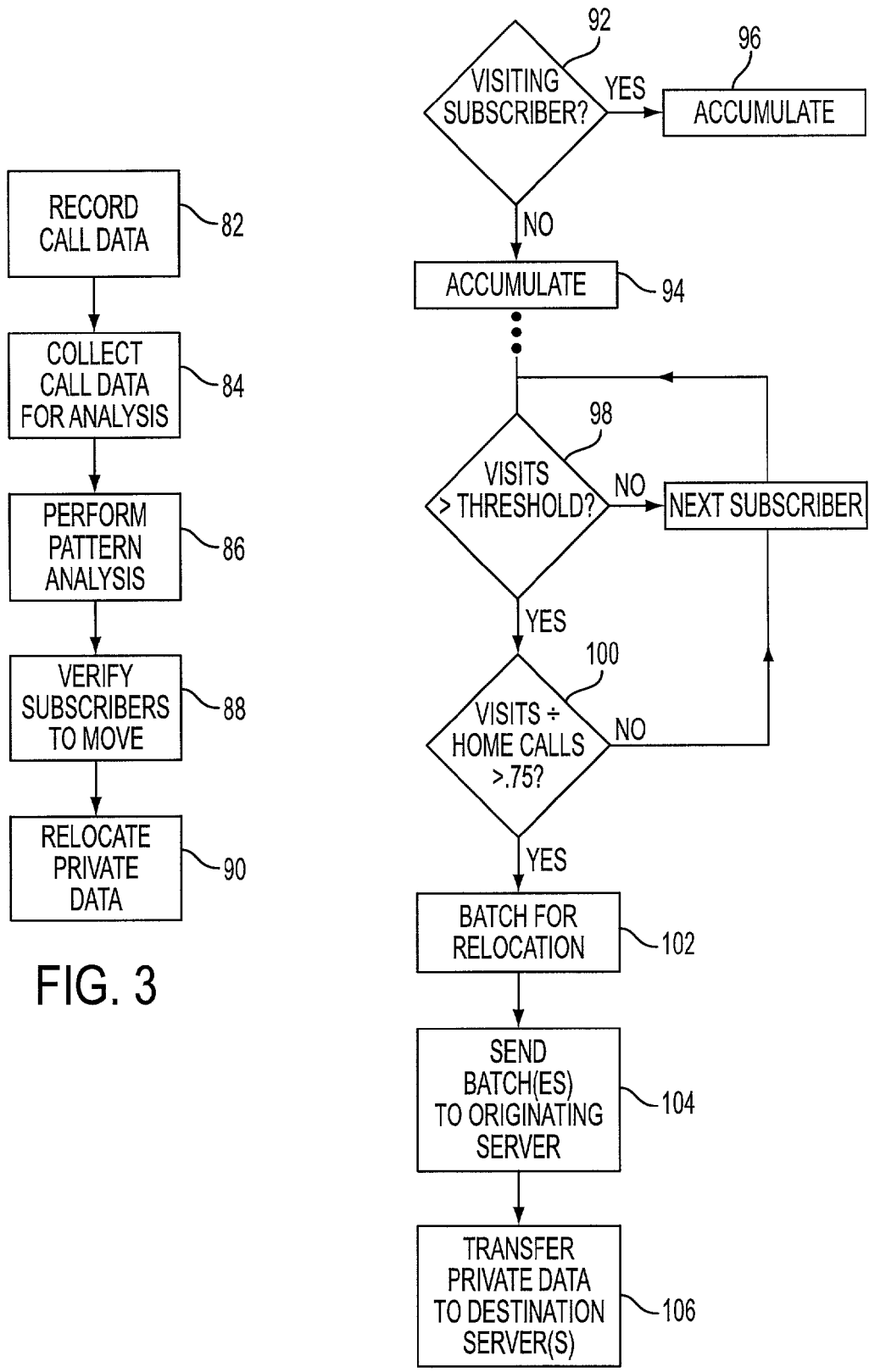
FIG. 3 is a flowchart of a method according to the present invention.
FIG. 4 is a flowchart of pattern analysis and relocating subscribers' private data.

As illustrated in FIG. 3, the preferred embodiment relies upon information that is recorded 82 by the MSU 32 when a subscriber accesses the information services system 10 via one of the information servers 12. Conventionally, information servers 12 such as the TRILOGUE® INfinity®, create activity logs that store information regarding voice mail, including all calls that create a message for subscribers, all calls by subscribers and outgoing calls to subscribers. In addition, the activity log tracks messages sent, transferred and replied to; message retrieval, receipt, duplication and deletion; etc. The activity log is used for billing purposes, statistical analysis, trouble shooting and other administrative functions. Similar logs of activity are typically kept by telephone and data communication equipment. Thus, it is expected that the call information required to implement the present invention is available in many types of access units and therefore the present invention is not limited to distributed information services systems utilizing the TRILOGUE® INfinity®.

To make use of the raw data accumulated in the activity log, the CMU 36 periodically collects 84 the data stored by each MSU 32 and stores the data in files for further processing. The processing may occur at individual information servers, such as when an information services system has only a single TRILOGUE® INfinity® or similar platform. In a distributed information services system 10 like that illustrated in FIG. 1, the collection 84 of data usually includes transmitting data from the information servers 12 to the management center 18 via data communication network 14. The process of transmitting data from the information servers 12 to the management center 18 may use any conventional technique, such as polling by the management center 18 or pushing from the information servers 12.

To implement the present invention, the data transmitted to the management center 18 (or analyzed by the information server 12) must include location data corresponding to subscriber calls and identifiers of the subscribers. The location data has two elements: the identity of the information server 12 on which the subscriber call has arrived and the identity of the information server 12 containing the home MSU 32. In the preferred embodiment, the data is analyzed by the management center 18 and the location data need only specify which information server 12 sent the data to the management center 18. It is also possible to perform the analysis described below in the information servers 12 in which case the location data is implicit in any data accumulated by the information server 12 in which the analysis is being performed. The subscriber identifier may be a voice mail box number, a telephone number of a mobile telephone, an email address, an IP address, etc.

After an activity log file containing the location data and identifiers has been generated, pattern analysis is performed 86 on the activity log file to determine which subscribers have accessed the distributed information services system 10 from a location remote from their home information server 12. Optionally, there may be verification 88, e.g., by human operators, of the subscribers selected for relocation. However, the present invention may be completely automatic with relocation 90 of private data occurring upon identification of a group or a single set of private data to be relocated.

A simplified example of pattern analysis is illustrated in FIG. 4. First, the collected call data is analyzed to detect 92 each time a subscriber has used an information server 12 whether the information server 12 has 94 the subscriber profile or other private data associated with the subscriber stored in its MSU 32, or needs 96 to refer to private data stored by a different information server. This can be detected by comparing the location data for subscribers with a record of where the subscribers' "home" information server 12 is located, by detecting messages sent between information servers 12 to send private data of subscribers from the home information server to the information server handling the call by the subscriber, or by similar techniques. After accumulating 94, 96 occurrences of subscribers accessing the distributed information services systems via home and non-home information servers for all of the data that has been collected, it is determined 98 whether a subscriber has more than a predefined number of access from a non-home information server. If so, the percentage of "non-home" accesses to "at-home" access is compared 100 with a predefined percentage. In the example illustrated in FIG. 4, the percentage is 75%, but the present invention is not limited to any particular percentage.

Other criteria may also be used to identify subscribers whose private data should be relocated. For example, the pattern analysis is preferably performed 86 periodically. If the period is as short as a week, the results of the pattern analysis may be accumulated before subscribers are moved, to avoid one- or two-week vacations, for example. Based upon a long term analysis of activity log files, it is possible to develop appropriate criteria for relocating subscribers.

The results of the pattern analysis are used to determine subscribers whose private data, such as subscriber profile data and optionally, messages, should be transferred from the current home information server to a new home information server. The subscriber data are preferably transferred at times that are determined to be "quiet" times for the information services system 10 so as not to create excessive load. This transfer may be performed automatically or under control of authorized employees of the telecommunications operator.

For example, as illustrated in FIG. 4, the identifiers of subscriber profiles may be batched 102 by current information servers. The identifiers for each batch are then sent 104 to the current information server storing the subscriber profiles for that batch. The current information server becomes an origination information server for the transfer 106 of subscriber profiles to at least one destination information server. The batches may be specific, such that all subscriber profiles in a batch go from the origination information server to a single destination information server, or may be routed to several destination information servers. In the preferred embodiment, the transfer 106 is coordinated by management center 18 which performs the analysis and sends the batches to the origination information servers. The management center 18 may also inform the destination information servers to prepare for receipt of the subscriber profiles, or this may be handled by communication directly between the origination information servers and the destination information servers.

Alternatively, the pattern analysis may be performed by each of the information servers 12. For example, if non-home information servers always contact the home information server whenever handling an access by a "visiting" subscriber, the home information server can compare the number of such requests with the number of requests for access it has handled for the subscriber and determine when it is appropriate to transfer the subscriber to a different information server. Alternatively, subscriber profiles may be held by non-home information servers for "visiting" subscribers and after it is determined 98 that the number of accesses by the visiting subscriber exceeds the first threshold for a given period of time, the non-home information server could query the home information server (or the management system 18) to find out how many times that subscriber accessed its home information server directly and request the transfer of the subscriber profile if the second threshold is met 100. If the analysis is performed by the information servers 12, the subscriber profiles may be transferred with or without batching.

Many of the known techniques for transferring data within a distributed information processing system can be used to transfer the subscribers' private data. Examples include the techniques disclosed in U.S. Pat. Nos. 5,627,877; 5,909,483; and 6,067,456, incorporated herein by reference. Most known techniques typically require some type of human identification of what private data should be transferred. As indicated above, this is unnecessary in the present invention. However, when the present invention is implemented in a voice mail system operated by a telephone company, the telephone company may desire to verify 88 the transfers before they occur. This can be accomplished by the connection between the communication network operator's host 20 and the management center 18.

The many features and advantages of the present invention are apparent from the detailed specification, and thus it is intended by the appended claims to cover all such features and advantages of the system that fall within the true spirit and scope of the invention. Further, numerous modifications and changes will readily occur to those skilled in the art from the disclosure of this invention, thus it is not desired to limit the invention to the exact construction and operation illustrated and described. Accordingly, modifications and equivalents may be resorted to as falling within the scope and spirit of the invention.

What is claimed is:

1. A method of relocating data in a communication system having at least one central management server and information servers geographically distributed to provide access to subscribers, said method comprising:
   generating at the information servers an activity log file including location data and identifiers, the location data indicating which of the information servers provided access by the subscribers to information locally accessible by the information servers and each identifier being associated with one of a communication device and a person using the communication system;
   initially storing the activity log file at the information servers;
   transferring log data derived from the activity log file from each of the information servers to the central management server;
   automatically performing pattern analysis at the central management server based on the location data and the identifiers; and
   relocating private data, associated with one of the identifiers, from a first location to a second location within the communication system when the pattern analysis indicates that service can be provided more efficiently from the second location.

2. A method as recited in claim 1, wherein said relocating is performed automatically.

3. A method as recited in claim 1, wherein the pattern analysis produces results periodically and said relocating is performed under manual control based on the results of the pattern analysis.

4. A method as recited in claim 1, wherein said relocating moves at least a subscriber profile included in the private data of at least one subscriber from one of the information servers to another information server.

5. A method as recited in claim 1,
   wherein the communication system is an information services system and the information servers store and access data to provide services to the subscribers, and
   wherein said relocating moves at least a subscriber profile included in the private data of at least one subscriber from one of the information servers to another information server.

6. A computer readable medium storing at least one program to control a computer to perform a method of relocating data in a communication system having at least one central management server and information servers geographically distributed to provide access to subscribers, said method comprising generating at the information servers an activity log file including location data and identifiers, the location data indicating which of the information servers provided access by the subscribers to information locally accessible by the information servers and each identifier being associated with one of a communication device and a person using the communication system;

initially storing the activity log file at the information servers;

transferring log data derived from the activity log file from each of the information servers to the central management server;

automatically performing pattern analysis at the central management server based on the location data and the identifiers; and relocating private data, associated with one of the identifiers, from a first location to a second location within the communication system when the pattern analysis indicates that service can be provided more efficiently from the second location.

7. A computer readable medium as recited in claim 6, wherein said relocating is performed automatically.

8. A computer readable medium as recited in claim 6, wherein the pattern analysis produces results periodically and said relocating is performed under manual control based on the results of the pattern analysis.

9. A computer readable medium as recited in claim 6, wherein said relocating moves at least a subscriber profile included in the private data of at least one subscriber from one of the information servers to another information server.

10. A computer readable medium as recited in claim 6,
wherein the communication system is an information services system and the information servers store and access data to provide services to the subscribers, and
wherein said relocating moves at least a subscriber profile included in the private data of at least one subscriber from one of the information servers to another information server.

11. An information services system having a data network, comprising:
information servers geographically distributed to provide access by subscribers to information locally accessible by said information servers, each information server including
at least one storage unit to store an activity log file including identifiers and access location identification data indicating which of the information servers provided access to the subscribers, each identifier associated with one of a communication device and a person using the communication system;
a processor, coupled to said storage unit, to extract log data from the activity log file; and
a router, coupled to the data network and at least one of said storage unit and said processor, to the log data over the data network; and
at least one central management server, coupled to the data network, to receive the log data, to automatically perform pattern analysis on the log data received from said information servers, based on the access location identification data and the identifiers, and to send instructions to said information servers to move at least a subscriber profile, associated with one of the identifiers, to a different information server when the pattern analysis indicates that service can be provided more efficiently from the different information server.

12. An information services system as recited in claim 11,
wherein said at least one central management server groups the identifiers of subscriber profiles into batches according to which of said information servers store the subscriber profiles associated with subscribers identified by the pattern analysis for relocation, and sends each batch to an origination information server storing the subscriber profiles, and
wherein the origination information server automatically relocates the subscriber profiles associated with the identifiers in the batch to at least one destination information server.

13. An information services system as recited in claim 11, wherein the information to which said information servers provide access by said subscribers includes at least one of facsimile data, e-mail data, voice mail data, financial data, news and sports reports, video on demand, music downloads, and business information, including at least one of addresses, telephone numbers and hours of operation.

14. An information services system as recited in claim 13, wherein said at least one storage unit stores the information to which said information servers provide access by said subscribers.

* * * * *

UNITED STATES PATENT AND TRADEMARK OFFICE
CERTIFICATE OF CORRECTION

PATENT NO. : 6,993,577 B2
APPLICATION NO. : 09/739745
DATED : January 31, 2006
INVENTOR(S) : Moshe Shavit et al.

It is certified that error appears in the above-identified patent and that said Letters Patent is hereby corrected as shown below:

On the First Page, Column 2 (Foreign Patent Documents), Line 1, after "7/1999" insert - - H04M003/42 - -.

Signed and Sealed this

Eighteenth Day of July, 2006

JON W. DUDAS
*Director of the United States Patent and Trademark Office*